(12) United States Patent
Rinne et al.

(10) Patent No.: US 7,706,352 B2
(45) Date of Patent: Apr. 27, 2010

(54) MULTICARRIER PILOT STRUCTURE FOR RELIABLE FRAME DETECTION

(75) Inventors: Mika Rinne, Espoo (FI); Ülo Parts, Helsinki (FI); Juha Korhonen, Espoo (FI)

(73) Assignee: Nokia Corporation, Espoo (FI)

( * ) Notice: Subject to any disclaimer, the term of this patent is extended or adjusted under 35 U.S.C. 154(b) by 642 days.

(21) Appl. No.: 11/580,041

(22) Filed: Oct. 13, 2006

(65) Prior Publication Data

US 2007/0098053 A1      May 3, 2007

Related U.S. Application Data

(60) Provisional application No. 60/731,874, filed on Nov. 1, 2005, provisional application No. 60/737,775, filed on Nov. 18, 2005.

(51) Int. Cl.
*H04J 3/06* (2006.01)
*H04J 3/00* (2006.01)
*H04B 7/212* (2006.01)
*H04B 1/00* (2006.01)

(52) U.S. Cl. .............. 370/350; 370/345; 370/347; 370/503; 370/512; 375/143; 375/149; 375/152

(58) Field of Classification Search .......... 370/343, 370/345, 347, 349, 350, 503, 512; 375/326, 375/143, 149, 152, 324; 455/437
See application file for complete search history.

(56) References Cited

U.S. PATENT DOCUMENTS

| | | | | |
|---|---|---|---|---|
| 5,373,507 | A | * 12/1994 | Skold | 370/350 |
| 2003/0103585 | A1 | * 6/2003 | Kim et al. | 375/340 |
| 2007/0058595 | A1 | * 3/2007 | Classon et al. | 370/337 |

FOREIGN PATENT DOCUMENTS

WO      WO 2007/023359 A2      3/2007

OTHER PUBLICATIONS

Wireless Crash Course, by Paul Bedell, Edition: 2, illustrated, revised, Published by McGraw-Hill Professional, 2005, p. 391, ISBN 007145280X, 9780071452809.*

(Continued)

*Primary Examiner*—Nick Corsaro
*Assistant Examiner*—Larry Sternbane
(74) *Attorney, Agent, or Firm*—Squire, Sanders & Dempsey, LLP (57) ABSTRACT

A pilot structure, a method, and a receiver for multi-carrier cellular communications defining a specific Time Division Multiplexer/Multiplexing pilot pattern and pilot sequence for a sub-frame with short system information. A primary synchronization sequence is configured to be transmitted every predetermine number of sub-frames in a defined bandwidth. A primary common pilot is configured to be transmitted for each sub-frame. Short system information is configured to be transmitted once per frame to define the pilot structure of sub-frames in a frame period to define a structure of a frame period.

48 Claims, 9 Drawing Sheets primary common pilot sequence
primary synchronization sequence
Short System Information (SSI)
additional common pilot for additional transmit antennas

OTHER PUBLICATIONS

Kallel, S.; Link, R.; Bakhtiyari, S., "Throughput performance of memory ARQ schemes," Vehicular Technology, IEEE Transactions on , vol. 48, No. 3, pp. 891-899, May 1999.*

"*Cell Search Procedure for Initial Synchronization and Neighbour Cell Identification*", 3GPP TSG RAN WG1 Meeting #43, Nov. 7-11, 2005, pp. 1-6.

"*EUTRA Cell Search for Initial Synchronization and Neighbor Cell Identification*", 3GPP TSP RAN WG1 #44 Meeting, Feb. 13-17, 2006, pp. 1-8.

"*Physical Channels and Multiplexing in Evolved UTRA Downlink*", 3GPP TSG RANN WG1 Ad Hoc on LTE, Jun. 20-21, 2005, pp. 1-24.

"*DL Pilot Structure and Synchronization Aspects (revision of R1-051089)*", 3GPP TSG RAN WG1 Meeting #42bis, Oct. 10-14, 2005, pp. 1-6.

International Search Report PCT/IB2006/002992 filed Oct. 25, 2006.

3RD Generation Partnership Project, 3GPP TR 25.814 vo.2.1; 3rd Generation Partnership Project; Technical Specification Group Radio Access Network; Physical Layer Aspects for Evolved UTRA (Release 7), Aug. 2005.

European search report; Issued on European Application No. 06820804.0-1525, dated Jul. 15, 2009.

* cited by examiner

▦ frequency bins of the primary common pilot sequence (solid)
▦ multiplexed shared control information or data (white)

FIG.5 sub-frame

MULTICARRIER PILOT STRUCTURE FOR RELIABLE FRAME DETECTION

REFERENCE TO RELATED APPLICATIONS

This application claims priority of U.S. Provisional Patent Application Ser. No. 60/731,874, filed Nov. 1, 2005 and U.S. Provisional Patent Application Ser. No. 60/737,775, filed Nov. 18, 2005. The subject matter of this earlier filed application is hereby incorporated by reference.

BACKGROUND OF THE INVENTION

1. Field of the Invention

This invention is related to a pilot structure, a method, and a receiver for multi-carrier cellular communications defining a specific Time Division Multiplexer/Multiplexing pilot pattern and pilot sequence for a sub-frame with short system information.

2. Description of the Related Art

Wireless communication systems are widely deployed to provide various types of communication such as voice, packet data, and so on. These systems may be multiple-access systems capable of supporting communication with multiple users sequentially or simultaneously by sharing the available system resources. Examples of such multiple-access systems include Code Division Multiple Access (CDMA) systems, Time Division Multiple Access (TDMA) systems, and Orthogonal Frequency Division Multiple Access (OFDMA) systems, other types of multi-carrier access schemes, or any combinations of these.

An accurate estimate of the response of a wireless channel between a transmitter and a receiver is needed in order to effectively transmit data on the available sub-bands. Channel estimation is typically performed by sending a pilot from the transmitter and measuring the pilot at the receiver. Since the pilot is made up of symbols that are known a priori by the receiver, the channel response can be estimated as the relation of the received pilot symbols over the transmitted pilot symbols. This relation may include any channel dependent information as amplitude, phase, frequency shift, angular spread, interference, noise, etc.

Pilot transmission represents overhead in a wireless communication system. Thus, it is desirable to minimize pilot transmission to the extent possible. However, because of noise, fading, Doppler, interference, angular dispersion and other artifacts in the wireless channel, a sufficient amount of pilot energy needs to be transmitted frequently enough in order for the receiver to obtain a reasonably accurate estimate of the time-variant channel response. Because the contributions of physical scatterers and the propagation paths to the channel response vary over time, the pilot transmission needs to be repeated regularly. The time duration over which the wireless channel may be assumed to be relatively constant is often referred to as a channel coherence time. The repeated pilot transmissions need to be spaced significantly closer in time than the channel coherence time to maintain high system performance. Similarly, for a wideband transmission, the pilot spacing in frequency also has to be sufficiently tight, to be able to estimate the full frequency dependent channel, which possibly extends over the coherence band. The coherence time of a channel may depend, for instance, on the velocity of the receiver. The coherence bandwidth of a channel may depend, for instance, on the delay spread of the channel.

In the downlink of a wireless communication system, a single pilot transmission from an access point (or a network element or a base station or a base station controller) may be used by a number of terminals to estimate the response of the distinct channels from the access point to each of the terminals. Furthermore, the pilot signals of different access points need to be separable form each other, from random data and from noise or interference to allow reliable estimation of the channel between the access point and the terminal. In the uplink, the channel from each of the terminals to the access point typically needs to be estimated through separate pilot transmissions from each of the terminals.

A special Short System Information (SSI) message present in every frame provides information pertaining to the wireless communication system, which is receivable by all terminals. Thus, the SSI has to be received by the terminals with good probability in all propagation and mobility conditions, in any reasonable cell deployment, and with any of the specified system bandwidths. In addition to frame synchronization, system bandwidth in a scalable bandwidth system (as Evolved Universal Terrestrial Radio Access Network (E-UTRA)), and the operation bandwidth is determined by receiving the SSI during the initial synchronization. In handover, the system bandwidth is given in the neighbor list, and decoding of the SSI is actually necessary mainly for frame timing detection. There is, therefore, a need in the art for a pilot structure and method that enables faster and more reliable finding of the system information message during the initial synchronization and during handover (preparation) in all propagation, mobility and interference conditions. The mobility conditions may include a receiver velocity up to 350 km/h.

SUMMARY OF THE INVENTION

In accordance with an embodiment of the present invention, there is provided a method and a computer program embodied on a computer readable medium, the method and the computer program provide configuring a primary synchronization sequence to be transmitted every predetermined number of sub-frames in a defined bandwidth, configuring a primary common pilot to be transmitted for each sub-frame, and configuring short system information to be transmitted once per frame for defining a structure of a frame period. The structure of the frame period comprises definitions of at least one of sub-frames, signaling channels, and pilot positions.

In accordance with an embodiment of the present invention, there is provided a method and a computer program embodied on a computer readable medium. The method and the computer program being configured to perform detecting a pilot sequence including a defined pilot structure, configuring short system information in the pilot sequence to be received as a self-decodable channel coding block with an error detection; and decoding the short system information to identify frame timing and a system bandwidth of a cell.

In accordance with an embodiment of the present invention, there is provided a communication system, including a network element configured to transmit a pilot sequence, and a user equipment configured to detect the pilot sequence, and to decode short system information in the pilot sequence to identify frame timing and a system bandwidth of a cell. The pilot sequence comprises a defined pilot structure including a primary synchronization sequence every predetermined number of sub-frames in a defined bandwidth, primary common pilot for each sub-frame, and short system information once per frame.

In accordance with an embodiment of the present invention, there is provided a communication system, including network element means for transmitting a pilot sequence, and user equipment means for detecting the pilot sequence, and decoding short system information in the pilot sequence to identify frame timing and a system bandwidth of a cell. The pilot sequence comprises a defined pilot structure including a primary synchronization sequence every predetermined number of sub-frames in a defined bandwidth, primary common pilot for each sub-frame, and short system information once per frame.

In accordance with an embodiment of the present invention, there is provided a user equipment, including a receiver configured to detect the pilot sequence, and to decode short system information to identify frame timing and a system bandwidth of a cell, wherein the frame comprises of a defined structure including a primary synchronization sequence every predetermined number of sub-frames in a defined bandwidth, a primary common pilot sequence for each sub-frame, and the short system information once per frame.

In accordance with an embodiment of the present invention, there is provided a network element, including a transmitter configured to transmit a primary synchronization sequence every predetermined number of sub-frames in a defined bandwidth, to transmit a primary common pilot for each sub-frame, and to transmit short system information once per frame to define a structure of a frame period.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

In accordance with an embodiment of the present invention, there is provided a pilot structure, a method, and a receiver for multi-carrier cellular communications, which allow fast and reliable cell search completion by frame detection. The present invention defines a specific pilot structure of sub-frames in a frame period, which allows a defined search of pilot sequences, soft combining of Short System Information (SSI) for frame detection and completion of a cell search procedure.

In one embodiment, the present invention relates to E-UTRA (Evolved Universal Mobile Telecommunications System Terrestrial Radio Access) systems, currently being evaluated and standardized for the long term evolution of Wideband Code Division Multiple Access (WCDMA) technology. The present invention has an impact on a frame structure and on a mobile receiver design, which improves reliability in a reception of system information message present in every frame, and, thus, allows faster and more reliable frame detection during initial synchronization and handover, as to more quickly acquire frame timing.

Figure 1:
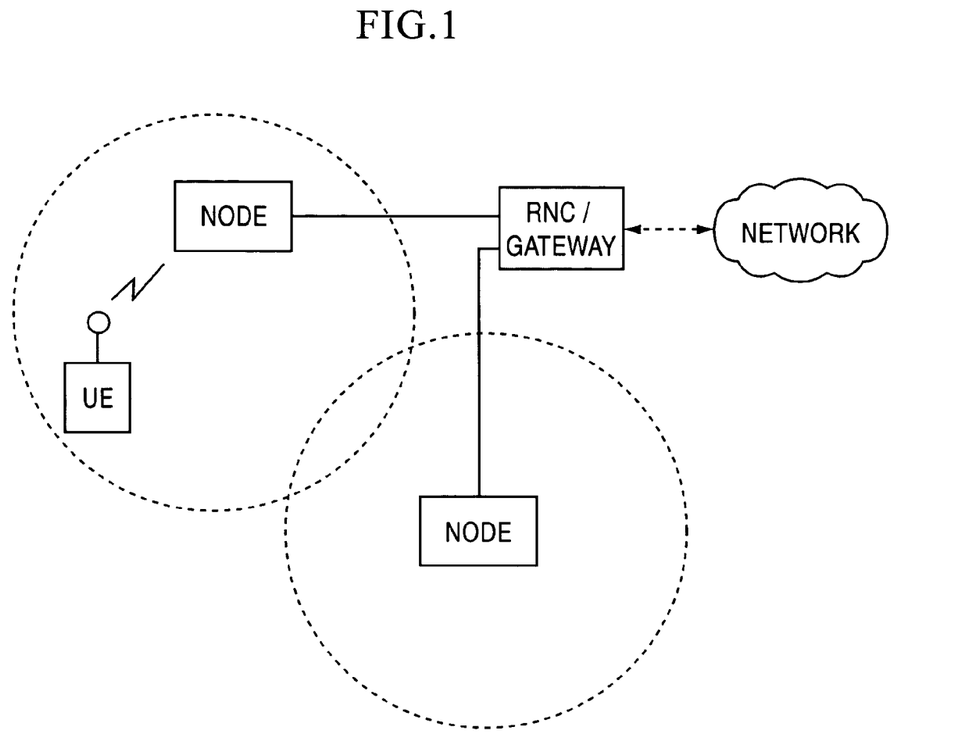
FIG. 1 illustrates an exemplary wireless network, in accordance with an embodiment of the present invention.

FIG. 1 illustrates an exemplary wireless network, in accordance with an embodiment of the present invention. As shown, user equipment (UE) wirelessly communicates with a Node serving the communication needs of a geographic area (often referred to as a cell or collection of cells). The UE may be a mobile phone, wireless equipped PDA, wireless equipped laptop, etc. enabling communication with a telecommunications network system. The Node may bi-directionally communicate with the MS. The Node may be referred to as the access point, a base station, a base station controller, or base transceiver station in other communication standards, each including a form of transmitter. The Node may bi-directionally communicate with a radio network controller (RNC). The RNC routes, for example, data between Nodes or on to a receiver or network element in another communication network such as the internet. Although not illustrated, in one embodiment, the Nodes may be operatively connected to a gateway that is a router to the network. In the alternative, the RNC may be operatively connected to a mobile station controller and/or a gateway, which would be responsible for connections of the system to the network. It will be obvious to one skilled in the art that the communication network may include other functions and structures, which need not be described in closer detail herein.

In accordance with a first embodiment of the present invention, there is provided Time Division Multiplexer/Multiplexing (TDM) dedicated pilots including a primary common pilot and an additional dedicated pilot in at least one symbol of a sub-frame, once per frame, for transmission antennas, from where the system information message is transmitted. For instance, a TDM dedicated pilot may be included in a third symbol of a sub-frame, once per frame. In an embodiment of the invention, a pilot sequence and a possible pilot scrambling sequence may be exactly the same as transmitted sequences of a primary common pilot. In accordance with an exemplary embodiment, the primary common pilot may be present in a first symbol of every sub-frame. An additional dedicated pilot may be applied at least to sub-carriers, where the SSI is transmitted or, alternatively, over a full orthogonal frequency division multiple access (OFDM) symbol.

The SSI reception is required to be reliable at high mobile receiver velocities, for instance, up to 350 km/h. To support high velocities for system information message reception and for initial synchronization, the TDM dedicated pilots are needed to be present as a default setting for the sub-frame, where the SSI is present, because a network would not know velocity of a particular terminal trying to access the network. Primary common pilots (PCP) alone are not assumed sufficient for all velocity conditions because the pilot overhead is optimized. In normal operation, in accordance with an embodiment of the present invention, additional dedicated pilots are planned to be added dynamically, when the signal reception at the terminal so requires. Reasons for additional dedicated pilots may be multi-antenna transmission formats and exceptionally difficult reception conditions, as high velocity.

In a Universal Mobile Telecommunications System (UMTS) Standard, the synchronization signal for the time-slot synchronization is transmitted via a P-SCH (Primary Synchronization Channel). A synchronization sequence, which is known in the receiver, has a length of 256-chip codeword, and is transmitted at a start of each time slot. The SSI may be transmitted once per frame, for instance, every 10 ms frame, but the P-SCH may be transmitted four or five times in a frame. Thus, after detection of the P-SCH, there may be four or five possible offsets for the SSI. Instead of trying reception of the SSI from maximum four or five places in a 10 ms window, a position of the SSI may be pre-checked by searching for a dual-sequence of a dedicated pilot sequence with a primary common pilot sequence. Thus, the TDM pilot structure and method thereof allow a reduction of an amount of decoding trials and computation during initial synchronization and handover.

In accordance with a second embodiment of the present invention, there is provided a system and method of soft combining of SSI message blocks in consecutive frames. Soft combining requires that the initial packet and a retransmitted packet be identical. Such soft combining of the SSI blocks significantly increases the probability of correct decoding and provides a more reliable detection when blocks are soft combined over cumulatively increasing time. Even a soft combination of blocks from two consecutive frames significantly improves the probability of correct decoding. Such improvement of the probability of correct decoding is essential because correct decoding is a requirement even in conditions of extremely low carrier-to-interference ratio, for instance, of the order of −10 dB, and with high receiver velocity. These requirements may make the probability of single shot successful decoding very low, despite several independent decoding-trial instances.

In accordance with a third embodiment of the present invention, a network scheduler is configured to utilize a sub-frame with the SSI to send non-time critical packets for high velocity terminals. Because the dedicated pilot is present in that sub-frame for synchronization, therefore, such network scheduler decreases a total number of overhead of pilot symbols in the system, even where the dedicated pilot is transmitted over all sub-carriers of the OFDM symbol.

To achieve the embodiments described above, the present invention defines a specific TDM pilot pattern and pilot sequences for a sub-frame with the SSI, which are used in combination to detect a frame during initial cell search, synchronization and during handover.

Figure 2:
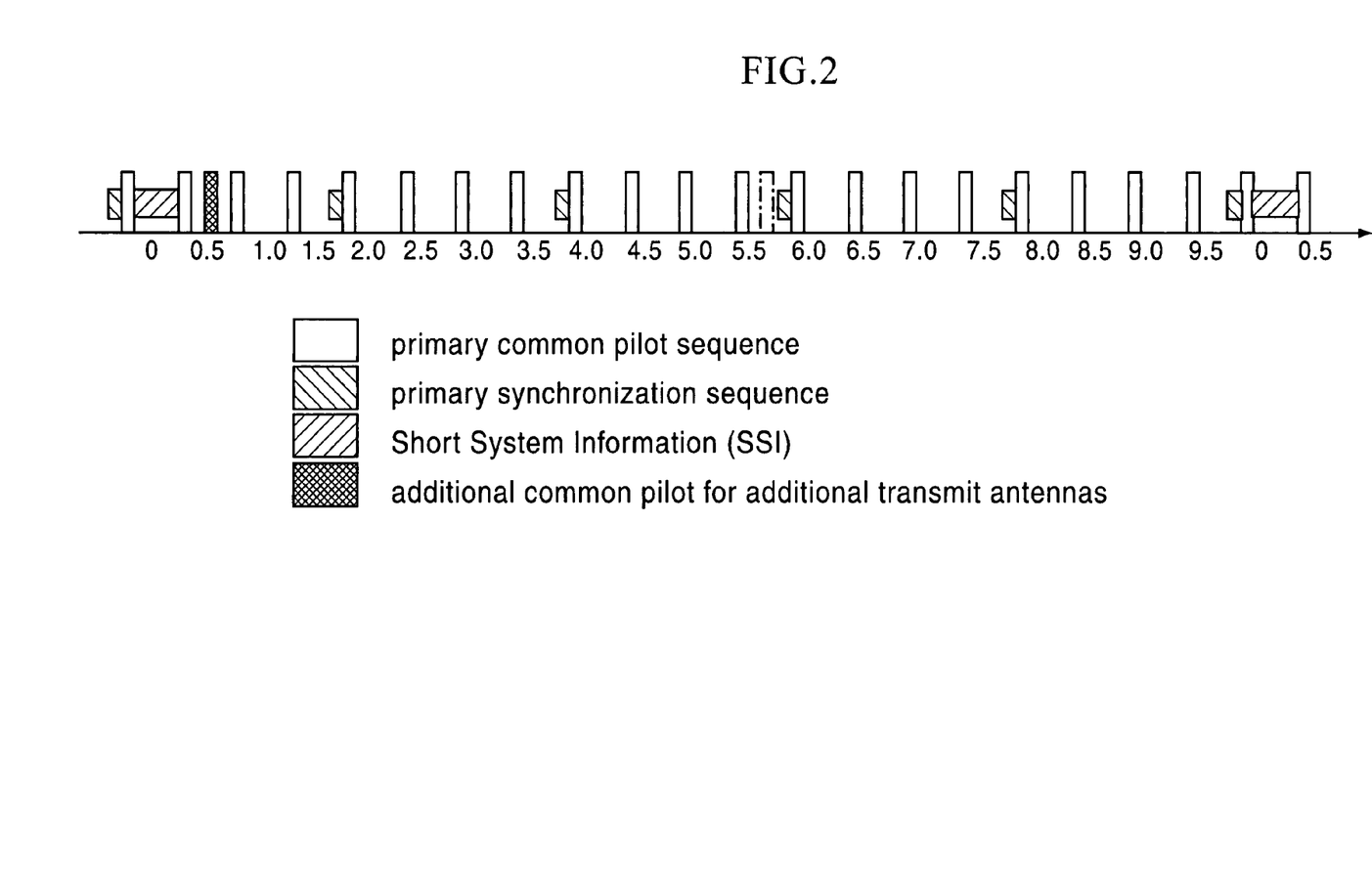
FIG. 2 illustrates an Evolved Universal Terrestrial Radio Access Network (E-UTRAN) frame, in accordance with an embodiment of the present invention.

The P-SCH may be present in every 4th (or 5th) sub-frame in a defined bandwidth (5 times is illustrated in FIG. 2). The UE may find all cells of a network that have low enough propagation loss to the receiver by filtering a center-most sub-carriers around a tried carrier raster center-frequency and by match filtering a known system specific P-SCH code. For instance, as illustrated in FIG. 2, an E-UTRAN frame of 10 ms may include 20 sub-frames. In each sub-frame a primary common pilot may be, for instance, in a first symbol of the sub-frame (i.e., a primary common pilot sequence). The SSI may be transmitted once per frame, which exactly determines the frame timing.

After the UE receives strong enough regular P-SCH signals, the UE can determine from a highest match filter peaks with a constant time difference, which access point signals are the strongest candidates. The peaks also reveal the periodicity of the common pilot sequences, which can be used for synchronization and channel estimation. It is important to know this periodicity, so that a trial procedure may efficiently find the correct PCP sequence in use in the target candidate access point, among the full set of sequences available in the network.

When the periodicity of the pilot sequence is known from the P-SCH peaks, it is possible to find the pilot sequence of that access point by trying cross-correlations of the received sequence and all of the a-priori known access point sequences (e.g., 128 pilot sequences). Even if the operating bandwidth is larger than 1.25 MHz, a search of the code sequence happens by the middle frequency-part of the sequence only. If a velocity of the receiver is high, test sequences may be cross-correlated to the received signal in short periods, shorter than the coherence time and averaged non-coherently over much longer time to form a reliable cross-correlation result. If the velocity of the receiver is slower, the coherent averaging time could be longer. However, the receiver is not expected to know its velocity, and, thus, a worst case averaging may be applied.

Once a pilot sequence out of all defined pilot sequences (i.e., approximately 128 pilot sequences) is reliably detected, the receiver starts to find the 10 ms frame timing and system bandwidth. The SSI may reveal frame timing. In order to determine frame timing, the SSI may be a self-decodable channel coding block with an error detection code, which appears once in every 10 ms frame. After the receiver has found the SSI and has successfully decoded it, the frame timing is guaranteed. The information contents of the SSI may also identify the system bandwidth of that cell. Accordingly, a receiver of the UE would have all the required knowledge to receive and decode signals from that cell.

The P-SCH should include enough samples for cross-correlating the received signal and a known system specific sequence, thus, the P-SCH is modulated to every sub-carrier on the 1.25 MHz band (e.g., 74 sub-carriers omitting a DC sub-carrier in recent E-UTRA parametrization). The synchronization and cell search requirements are actually very tight. The receiver of the UE may be able to reliably find cells in reasonably short time, even if the signal to interference ratios are very low, for instance, −7 dB to −10 dB, and even if the velocity of the receiver is very high, for instance, up to 350 km/h.

Figure 3A:
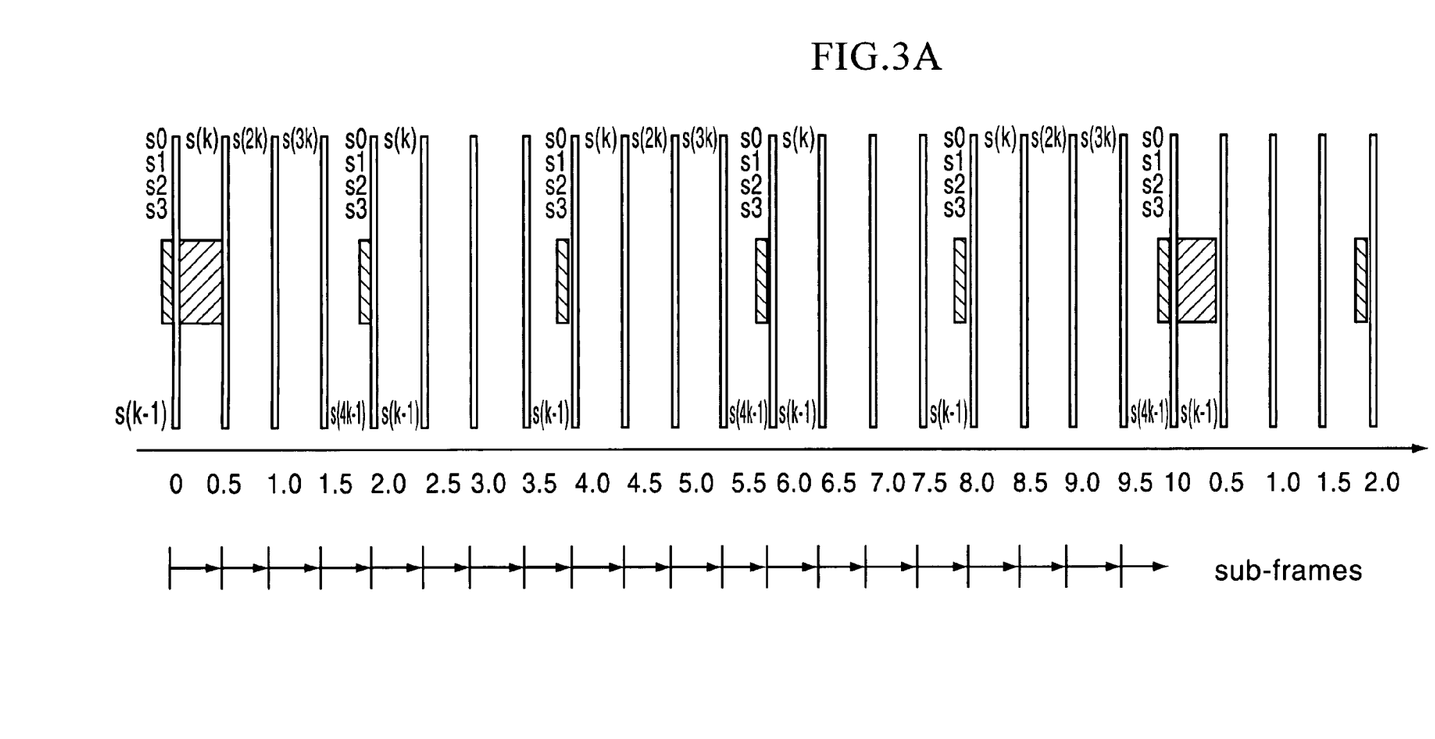
FIG. 3A illustrates an E-UTRAN frame structure with primary common pilot sequence repetition, in accordance with an embodiment of the present invention.
Figure 3B:
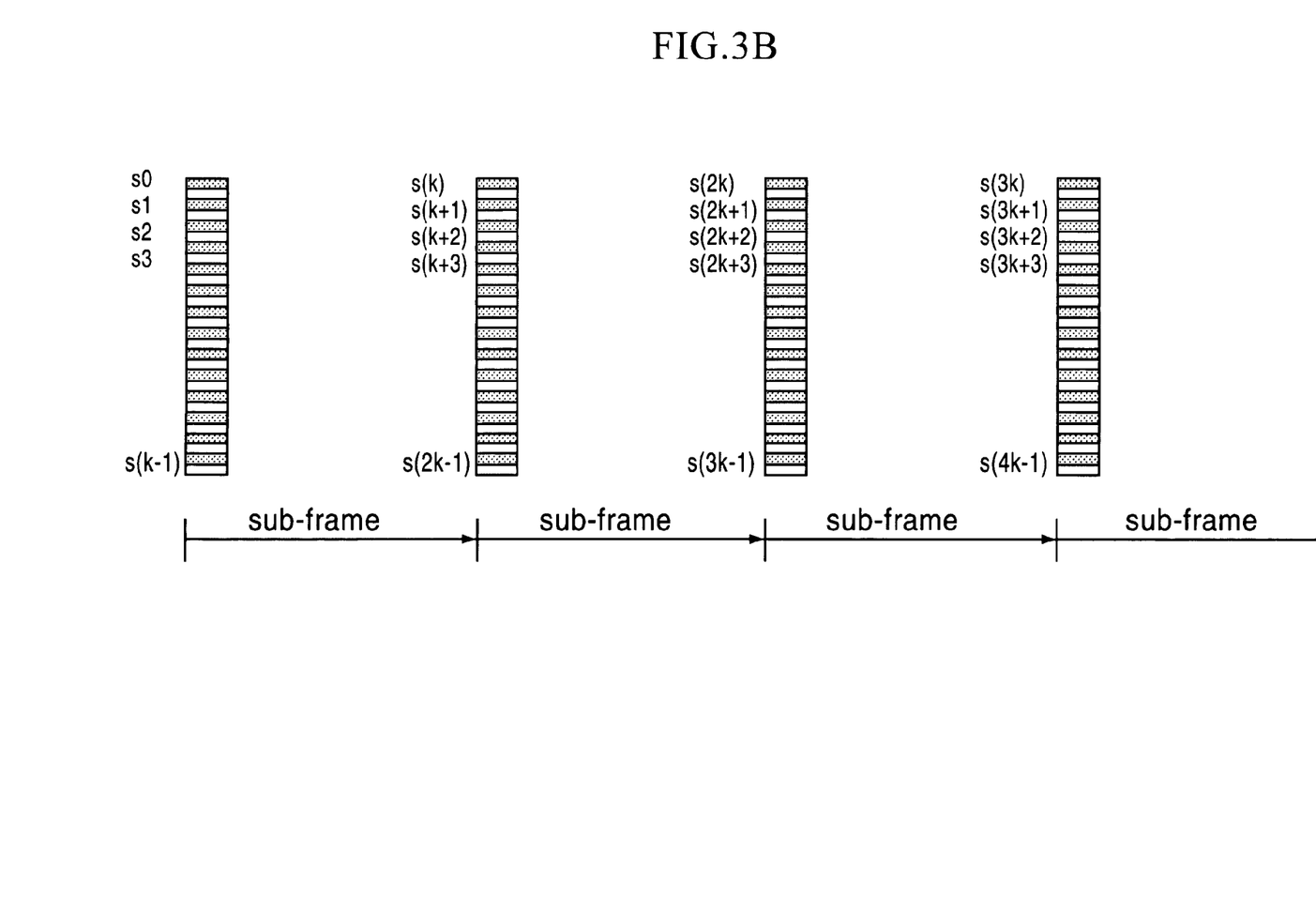
FIG. 3B illustrates a notation of the pilot sequence extending over given frequency bins in every Time Division Multiplexer/Multiplexing (TDM) pilot symbol during four sub-frames, in accordance with an embodiment of the present invention.
Figure 4:
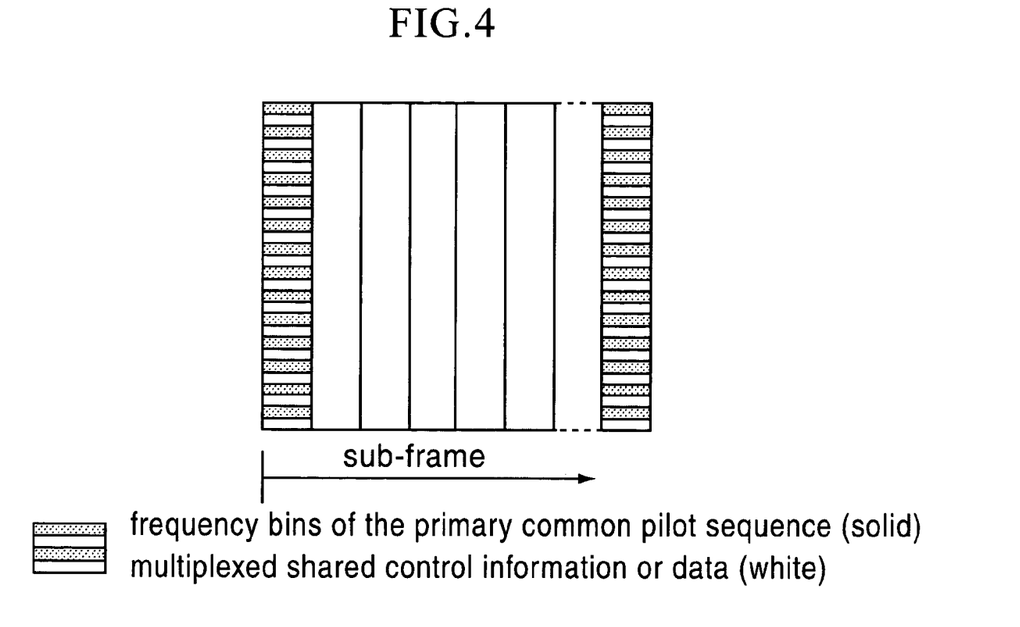
FIG. 4 illustrates a regular sub-frame with TDM common pilots without system information present, in accordance with an embodiment of the present invention.

FIG. 3A illustrates an E-UTRA frame structure with primary common pilot sequence repetition. In one embodiment, the frame structure of the frame period may be defined as a frame including a sequence of symbols forming sub-frames and a manner in which signaling and other channels may be placed therein. The frame structure of the frame period may include definitions of at least one of sub-frames, signaling channels or pilot positions. In FIG. 3A, a pilot sequence extends over four time domain symbols, one per each four sub-frames, and over defined frequency bins of each time domain symbol carrying the pilot symbols. FIG. 3B illustrates a notation of the pilot sequence extending over given frequency bins in every TDM pilot symbol during four sub-frames. If the deployed carrier bandwidth is different from the largest defined system bandwidth, the pilot sequence will use that subset of samples, which actually belong to the frequencies of the deployed carrier bandwidth. FIG. 4 illustrates a regular sub-frame with TDM common pilots without the SSI present.

However, even if the pilot sequence is already detected and accurate synchronization is acquired, decoding the SSI needs to be also resolved because demodulation and decoding of the SSI requires an accurate channel estimate. Typically, a channel estimate is created by filtering the signal over several sub-frames and using pilot sequences from several sub-frames. However, as noted earlier, such method of creating the channel estimate may not be applicable for a high velocity receiver because filtering over coherence time of the channel is not feasible and the coherence time of the high velocity receiver may get down to a little bit longer than one sub-frame.

Figure 5:
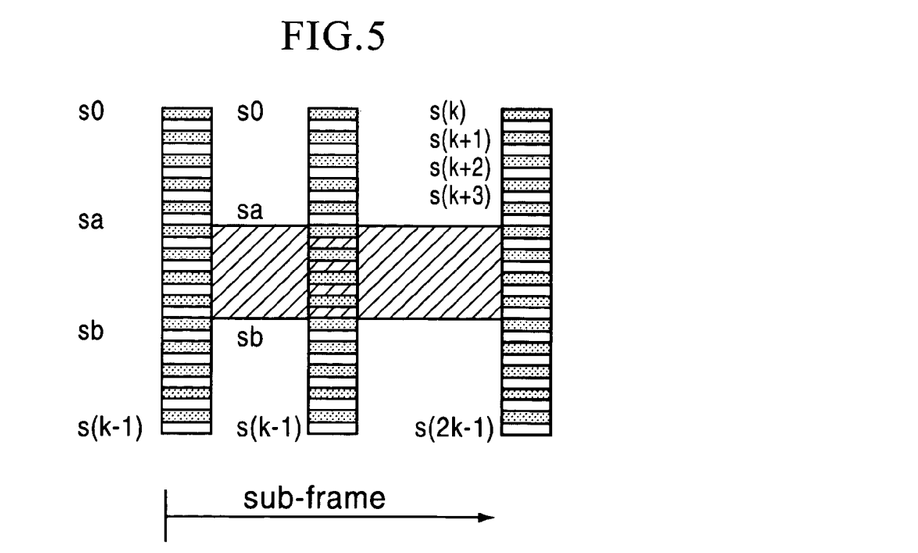
FIG. 5 illustrates an example of a sub-frame structure, in accordance with an embodiment of the present invention.

Therefore, in accordance with an embodiment of the present invention, to create the channel estimate at a high velocity receiver may be accomplished by adding dedicated pilot symbols. A suggested structure of a first sub-frame of the frame is shown in FIG. 5. FIG. 5 illustrates an example of a sub-frame structure, in accordance with an embodiment of the present invention, which includes the SSI and an additional common pilot, as a copy of the primary common pilot. Reliable decoding at high velocities requires that an additional pilot symbol is inserted, which according to an embodiment of the present invention, will have exactly the same pilot sequence as the first symbol. In accordance with an alternative embodiment, the additional pilot symbol may be inserted only for the sub-carriers, where the SSI is allocated (i.e. the center part). Then, the additional pilot symbol sequence in a center-part may be the same as middle part samples of the primary common pilot, shown in FIG. 5 as frequency indexes [sa . . . sb] of the additional pilot symbol. It should be noted that even in the case where the SSI is not needed for initial synchronization and handover, the requirement of reliable frame detection at high speeds is always inherent.

The issue with initial cell search procedure is that the velocity of the receiver is not known and all terminals despite of a corresponding velocity need to be able to access the system reliably and fast. For this purpose, in accordance with an embodiment of the present invention, the sub-frame, which includes the SSI for frame detection includes samples of additional pilot sequence in the 1.25 MHz band. Without this additional sequence, the receiver would have too few samples of a pilot, as the parametrization proposes a pilot symbol every ½, ⅓, ¼ or ⅙ sub-carrier from one transmit antenna and 1, ½, ⅓, ¼ or ⅙ sub-carriers from two transmit antennas. A $75^{th}$ ($74^{th}$ effective) sub-carrier center-part of the bandwidth and ⅙ pilot allocation means that approximately 12 pilot symbols are present. Even the highest velocity, shortest coherence time, allows filtering of two consequent sequences, but not more. In an interfered situation, an interferer being an adjacent access point pilot sequence, random data or thermal noise, there is still a requirement that the channel estimation works.

The present invention proposes additional common pilots to be copied and placed, for instance, into the $3^{rd}$ (or $4^{th}$) symbol of the sub-frame. There would then be three groups of pilots for estimating channel for the SSI detection: the primary common pilots in the sub-frame containing the SSI, the additional common pilots, and the primary common pilots at the beginning of the next sub-frame. Such arrangement allows processing of two groups of pilots well within the coherence time in all reception conditions. This improves the channel estimation especially in the case of fast moving UEs.

P-SCH is transmitted 4 (or 5) times during a frame and SSI is transmitted only once. One way of finding the SSI, in accordance with an embodiment of the present invention, is to try different (4 or 5) offsets until decoding succeeds. Such embodiment may provide a more efficient method of finding the right position of SSI during initial synchronization and handover by trying to correlate the primary common pilots with the additional dedicated common pilots of the sub-frame, where the SSI block is expected to be located. As discussed, the SSI is determined by detecting the P-SCH matched filter peaks. Based on an embodiment of the present invention, the SSI block would not be detected by blind decoding after every P-SCH occurrence. Instead, the additional common pilot sequence would be searched from pre-defined positions, relative to the primary common pilot, and if it is found, the SSI will be demodulated and decoded.

If at any time, the probability of correct decoding is not sufficient from the single-shot of the SSI, the receiver may store the received and demodulated samples in a soft-combining buffer and combine the SSI received again after one frame, soft combine the buffer contents and try decoding again. Soft-combining is known to significantly improve the probability of correct coding as the received symbol energy can be accumulated. Without a dual-sequence, it would not be possible to form candidates of SSI positions in a frame level and it would not be known which trial blocks of SSI to soft-combine as this would corrupt the combination result. Without the dual-sequence, every potential occurrence of SSI has to be soft-combined separately with its potential next occurrence or the search sequence has to be otherwise known. Thus, four (or five) parallel soft-combing candidates, for every P-SCH occurrence, have to be maintained, until decoding is found to be successful. Thus, soft-combining of SSI needs less memory and much less processing from the UE with the invented method.

As an alternative to the dual-sequence solution, it is possible to use other a-priori known sequences to assist detection of the SSI position and its channel estimation. In the alternative case, the a-priori known sequence is not a copy of the primary common pilot sequence, but is still a specific sequence known in the receiver. Benefit of using a copy of the primary common pilot sequence samples in the dedicated pilot is that cell separation is guaranteed at once and no separate search of these dedicated sequences is necessary. If a copy of the primary common pilot sequences is not used, the dedicated sequences may need to be searched separately and even then, the access points may need to be distinguished respectively.

Thus, in accordance with an embodiment of the present invention, a transmitter in an access point may be configured to transmit a primary synchronization sequence every predetermined number of sub-frames in a defined bandwidth, to transmit a primary common pilot for each sub-frame, and to transmit short system information once per frame to define a pilot structure in a frame period.

The UE, in turn, may be configured to include a receiver to detect a pilot sequence, and to decode the short system information to identify frame timing and a system bandwidth of a cell. The pilot sequence would include a defined pilot structure including a primary synchronization sequence every predetermined number of sub-frames in a defined bandwidth, primary common pilot for each sub-frame, and short system information once per frame. The UE receiver may also be configured to receive primary synchronization sequence signals and to determine strongest access point signals using highest match filter peaks with a constant time difference. The UE receiver may configure the highest match filter peaks to define a periodicity of the primary common pilot sequence to be used for synchronization and channel estimation. The UE receiver may also determine a periodicity of the primary common pilot sequence from the primary synchronization sequence peaks, and find a pilot sequence of a particular access point by cross-correlating the received pilot sequence with a-priori known pilot sequences associated with all access points.

The UE receiver may receive short system information blocks in consecutive frames, demodulate the short system information blocks, store the short system information blocks, combine the short system information received again after one frame, soft combine the soft-combining buffer contents, and repeat decoding.

Figure 6A:
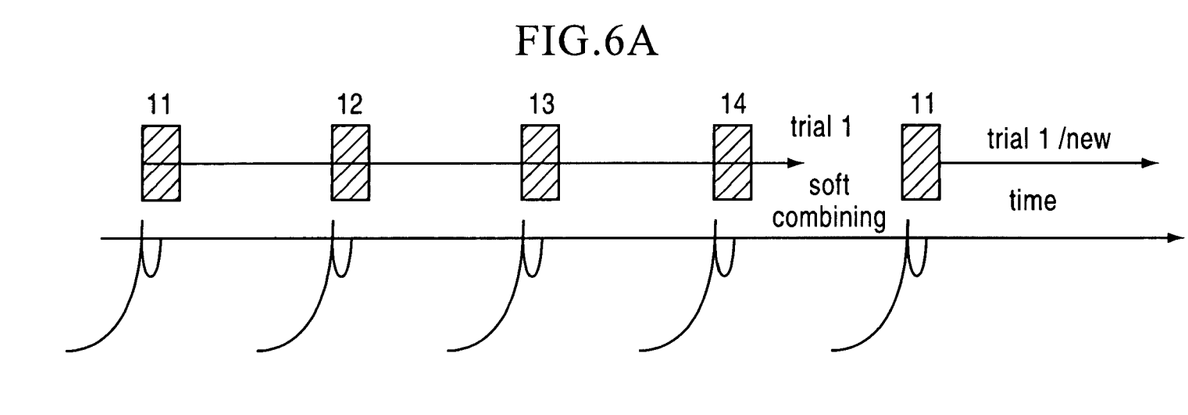
FIG. 6A illustrates a soft combining process, in accordance with an embodiment of the present invention.

FIG. 6A illustrates a soft-combining process, in accordance with an embodiment of the present invention. Search of the dual-sequences ($\mu$) will allow finding of SSI to decode. The SSIs are received from consequent frames and soft-combined until decoding is successful. A new trial will be initialized, whenever combining of, for instance, four blocks does not result a successful decoding result.

Figure 6B:
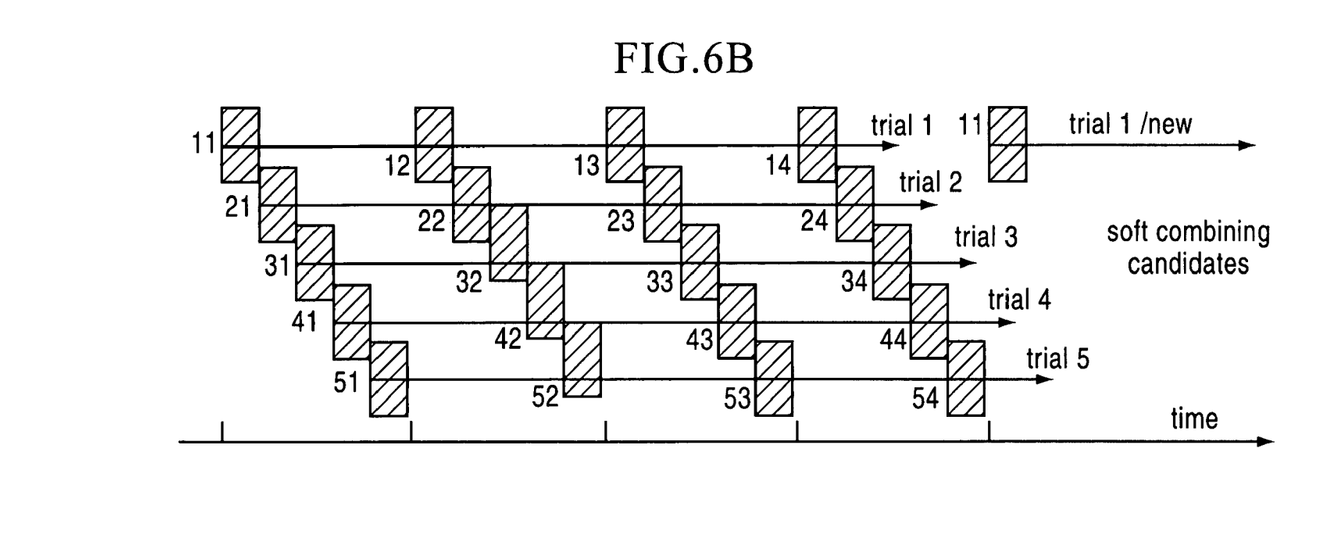
FIG. 6B illustrates a blind soft combining process, in accordance with an embodiment of the present invention.

FIG. 6B illustrates a blind soft combining process, in accordance with an embodiment of the present invention. The blind soft combining process may include trials of five sequence offsets. The dual-sequence ($\mu$) is not available here. A set of new trials may be initialized whenever any of the combining trials, for instance, four blocks do not result a successful decoding result.

Figure 7:
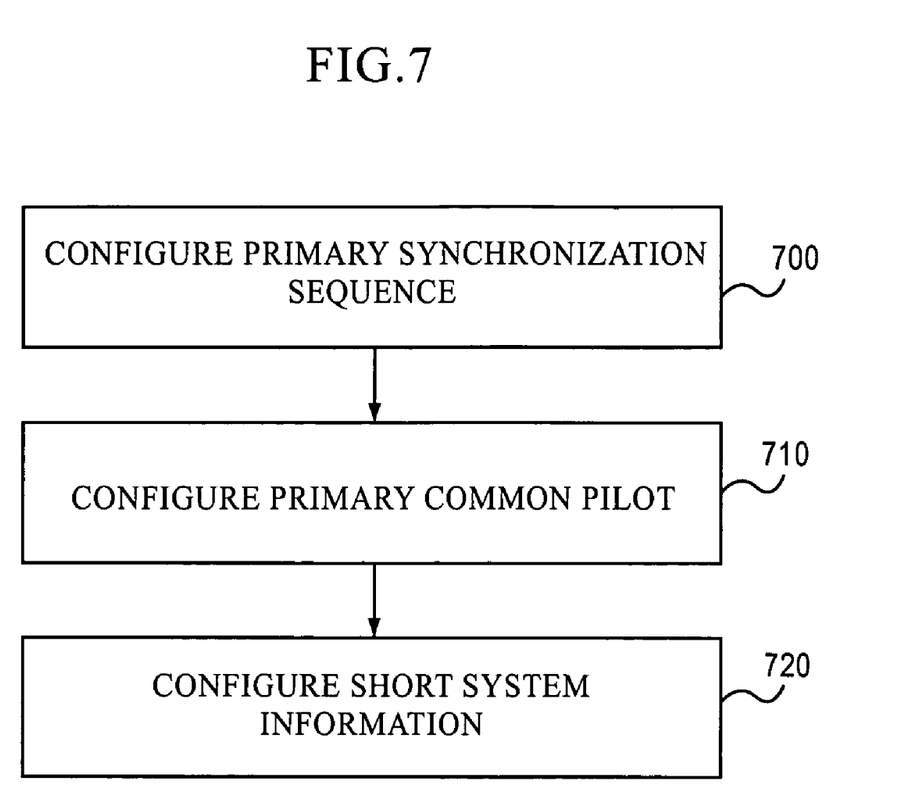
FIG. 7 illustrates a method to define a pilot structure in a frame period, in accordance with an embodiment of the present invention.

FIG. 7 illustrates a method to define a pilot structure in a frame period, in accordance with an embodiment of the present invention. At step 700, the method configures a primary synchronization sequence to be transmitted every predetermined number of sub-frames in a defined bandwidth. At step 710, the method configures a primary common pilot to be transmitted for each sub-frame. At step 720, the method configures short system information to be transmitted once per frame to define the pilot structure of sub-frames in a frame period to define a pilot structure in a frame period.

In accordance with an embodiment of the present invention, soft combining may be performed as the SSI contains information, which is constant or changes very rarely in time. Also, its channel coding scheme remains fixed. The requirement of soft combining is that the information bits of the channel coding blocks to be combined are exactly the same. The SSI, by definition, easily meets the requirement of soft-combining. If a given bit-field in the SSI has to change occasionally, it would only corrupt the soft combining result at the very time-instant, when the soft combining buffer would contain both the previous information contents and the updated information contents. This is not crucial, as it is reasonable to try soft combining of up to four or six received blocks and if the decoding is still not successful, discard all samples and start forming the soft-combining buffers afresh again.

Figure 8A:
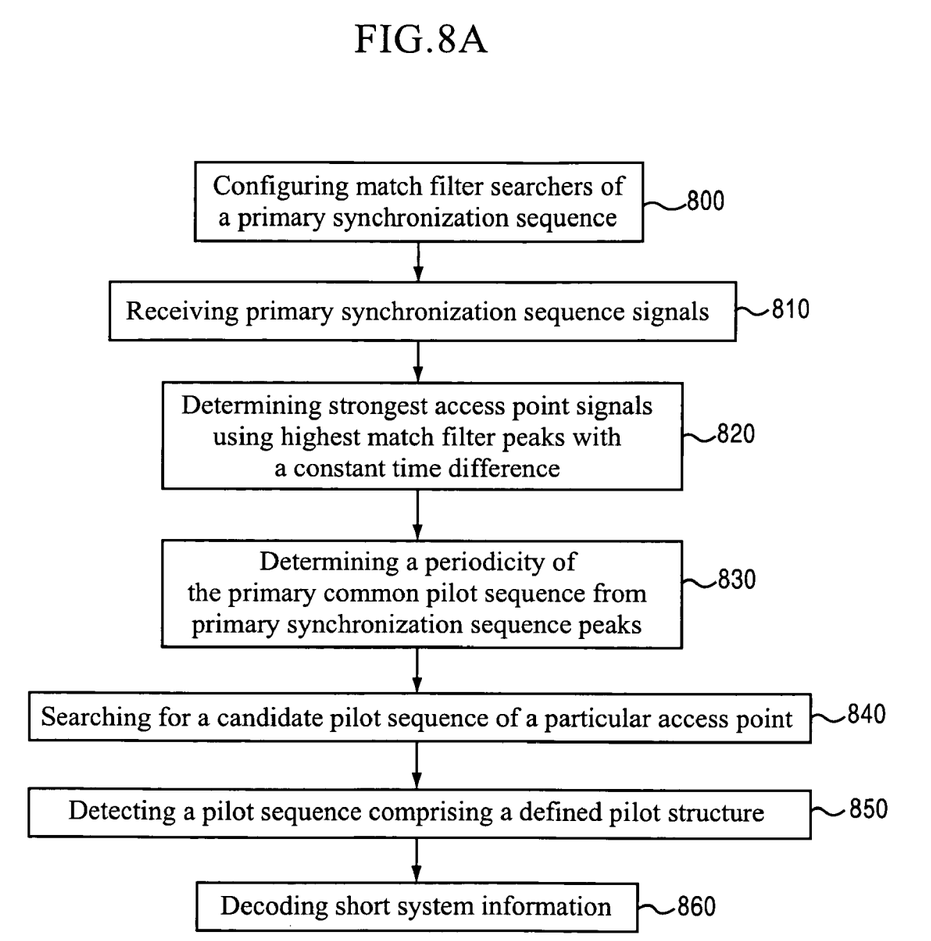
FIGS. 8A-8B illustrate methods performed by a receiver in a user equipment, in accordance with an embodiment of the present invention.

FIG. 8A illustrates a method performed by a receiver in the UE, in accordance with an embodiment of the present invention. At step 800, the method may configure the highest match filter peaks to define a periodicity of a primary common pilot sequence to be used for synchronization and channel estimation. At step 810, the method receives primary synchronization sequence signals. At step 820, the method determines the strongest access point signals using highest match filter peaks with a constant time difference. At step 830, the method determines a periodicity of the primary common pilot sequence from the primary synchronization sequence peaks. At step 840, the method searches for a candidate pilot sequence of a particular access point by cross-correlating the received pilot sequence with a-priori known pilot sequences associated with all access points.

At step 850, the method detects a pilot sequence including the defined pilot structure, in which the short system information may be configured as a self-decodable channel coding block with an error detection code appearing once in every frame. At step 860, the method decodes the short system information to identify frame timing and a system bandwidth of a cell. The pilot sequence may include a defined pilot structure including a primary synchronization sequence every predetermined number of sub-frames in a defined bandwidth, primary common pilot for each sub-frame, and short system information once per frame. The predetermined number of sub-frames may be defined in the defined bandwidth as every fourth or fifth sub-frame and the primary common pilot are defined to be present in a first symbol of every sub-frame.

Figure 8B:
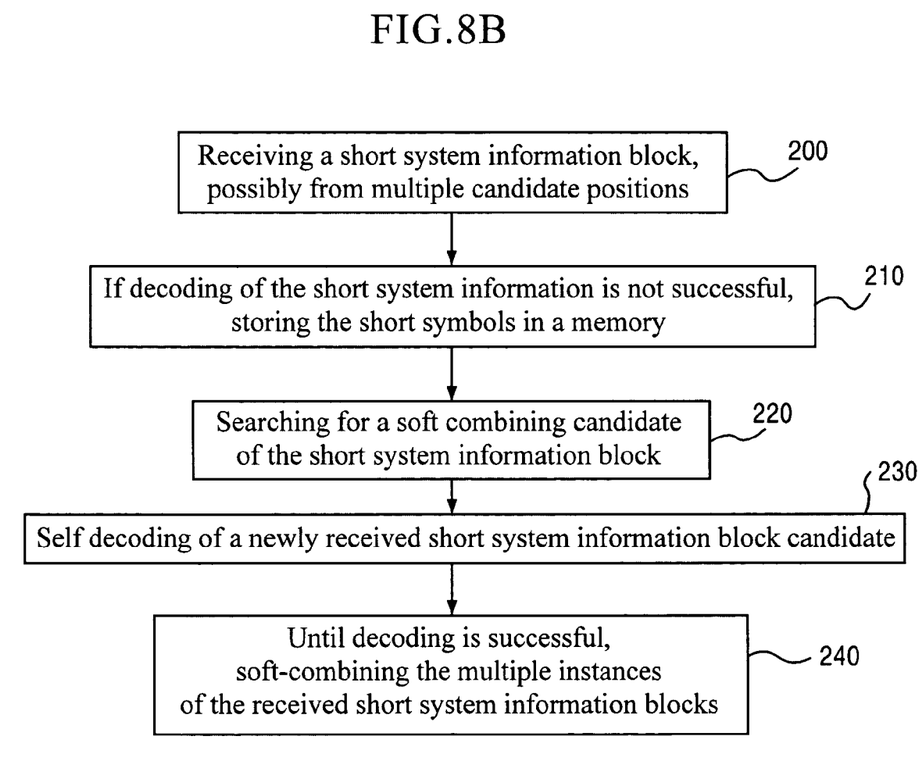

The following steps illustrated in FIG. 8B may be also performed by the receiver in accordance with an alternative embodiment of the present invention. At step 200, the method receives a short system information block, possibly from multiple candidate positions. At step 210, if decoding of the short system information is not successful, the method stores the short symbols in a memory. At step 220, the method searches for a soft combining candidate of the short system information block. At step 230, the method self decodes a newly received short system information block candidate. At step 240, until decoding is successful, the method soft-combines the multiple instances of the received short system information blocks.

Many advantages are provided by the pilot structure, method, and receiver of the present invention. For instance, a more reliable frame detection and Short System Information reception for high velocity terminals is provided. Also, fewer trials and less processing in finding system information block position during initial synchronization is required. The implementation of soft-combining for decoding of the Short System Information of the present invention is less complex and enables decrease of pilot overhead.

It is to be understood that in the embodiment of the present invention, the operations are performed in the sequence and manner as shown although the order of some operations and the like may be changed without departing from the spirit and scope of the present invention.

The steps of the methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

With respect to the present invention, network devices may be any device that utilizes network data, and can include switches, routers, bridges, gateways or servers. In addition, while the terms frame and signals have been used in the description of the present invention, the invention has import to many types of network data. For purposes of this invention, the term data includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A method in a wireless communication system, comprising:
configuring, at a network element, a synchronization sequence to be transmitted every predetermined number of sub-frames in a defined bandwidth;
configuring a pilot to be transmitted for each sub-frame;
configuring system information to be transmitted once per frame to define a structure of a frame period, wherein the structure of the frame period comprises definitions of at least one of sub-frames, signaling channels, and pilot positions; and
defining the predetermined number of sub-frames in the defined bandwidth as every fourth or fifth sub-frame.

2. A method in a wireless communication system, comprising:
detecting, at a user equipment, a pilot sequence comprising a defined pilot structure;
decoding system information to identify frame timing and a system bandwidth of a cell, wherein the system information comprises a self-decodable channel coding block with an error detection, and wherein a frame comprises a defined structure including a synchronization sequence every predetermined number of sub-frames in a defined bandwidth;
receiving synchronization sequence signals; and
determining strongest access point signals using highest match filter peaks with a constant time difference,
wherein the predetermined number of sub-frames in the bandwidth comprises every fourth or fifth sub-frame.

3. The method as recited in claim 1, further comprising:
defining the pilot to be present in a first symbol of every sub-frame.

4. The method as recited in claim 1, further comprising:
transmitting the system information once per frame to define frame timing.

5. The method as recited in claim 2, further comprising:
configuring the highest match filter peaks to define a periodicity of the pilot sequence to be used for synchronization and channel estimation.

6. The method as recited in claim 2, further comprising:
determining a periodicity of the pilot sequence from the synchronization sequence peaks; and
finding a pilot sequence of a particular access point by cross-correlating the received pilot sequence with a-priori known pilot sequences associated with all access points.

7. The method as recited in claim 1, further comprising:
adding at least one dedicated pilot symbol being same as the pilot for sub-carriers including the system information to create a channel estimate at a high velocity receiver.

8. The method as recited in claim 2, further comprising:
receiving system information blocks in consecutive frames;
demodulating the system information blocks;
storing the system information blocks in a soft-combining buffer;
combining the system information received again after one frame;
soft combining the soft-combining buffer contents; and
repeating decoding.

9. A computer program product comprising a computer program embodied on a computer readable medium, the computer program being configured to cause, if the program is executed, an apparatus in a wireless communication system to perform at least the following:
configuring a synchronization sequence to be transmitted every predetermined number of sub-frames in a defined bandwidth;
configuring a pilot to be transmitted for each sub-frame; and
configuring system information to be transmitted once per frame for defining a structure of a frame period, wherein the structure of the frame period comprises definitions of at least one of sub-frames, signaling channels, and pilot positions,
wherein the predetermined number of sub-frames in the defined bandwidth is configured as every fourth or fifth sub-frame.

10. A computer program product comprising a computer program embodied on a computer readable medium, the computer program being configured to cause, if the program is executed, an apparatus in a wireless communication system to perform at least the following:
detecting a pilot sequence comprising a defined pilot structure;
decoding system information to identify frame timing and a system bandwidth of a cell, wherein the system information comprises a self-decodable channel coding block with an error detection, and wherein a frame comprises a defined structure including a synchronization sequence every predetermined number of sub-frames in a defined bandwidth;
receiving synchronization sequence signals; and
determining strongest access point signals using highest match filter peaks with a constant time difference,
wherein the predetermined number of sub-frames in the bandwidth comprises every fourth or fifth sub-frame.

11. The computer program product as recited in claim 10, being further configured to cause an apparatus in a wireless communication system to perform at least the following:
receiving system information blocks in consecutive frames;
demodulating the system information blocks;
storing the system information blocks in a soft-combining buffer;
combining the system information received again after one frame;
soft combining the soft-combining buffer contents; and
repeating decoding.

12. A wireless communication system, comprising:
network element means for transmitting a pilot sequence; and
user equipment means for detecting the pilot sequence, and decoding system information in the pilot sequence to identify frame timing and a system bandwidth of a cell, wherein the pilot sequence comprises a defined pilot structure comprising a synchronization sequence every predetermined number of sub-frames in a defined bandwidth, pilot for each sub-frame, and system information once per frame,
wherein the predetermined number of sub-frames in the defined bandwidth is configured as every fourth or fifth sub-frame.

13. An apparatus in a wireless communication system, comprising:
a receiver configured to detect a pilot sequence, and to decode system information to identify frame timing and a system bandwidth of a cell, wherein the frame comprises a defined structure including a synchronization sequence every predetermined number of sub-frames in a defined bandwidth, a pilot sequence for each sub-frame, and the system information once per frame, wherein the receiver is configured to receive synchronization sequence signals and to determine strongest access point signals using highest match filter peaks with a constant time difference, and wherein the predetermined number of sub-frames in the bandwidth for receiving the synchronization sequence comprises every fourth or fifth sub-frame.

14. The apparatus as recited in claim 13, wherein the system information comprises a self-decodable channel coding block with an error detection calculation.

15. The apparatus as recited in claim 13, wherein a pilot is received from a first symbol of every sub-frame.

16. The apparatus as recited in claim 13, wherein the system information is received once per frame to define frame timing.

17. The apparatus as recited in claim 13, wherein the receiver configures the highest match filter peaks to define a periodicity of the pilot sequence to be used for synchronization and channel estimation.

18. The apparatus as recited in claim 13, wherein the receiver is further configured to determine a periodicity of the pilot sequence from the synchronization sequence peaks, and to find a pilot sequence of a particular access point by cross-correlating the received pilot sequence with a-priori known pilot sequences associated with all access points.

19. The apparatus as recited in claim 13, wherein the receiver is further configured to receive system information blocks in consecutive frames, to demodulate the system information blocks, to store the system information blocks, to combine the system information received again after one frame, to soft combine the soft-combining buffer contents, and to repeat decoding.

20. An apparatus in a wireless communication system, comprising:

a transmitter configured to transmit a synchronization sequence every predetermined number of sub-frames in a defined bandwidth, to transmit a pilot for each sub-frame, and to transmit system information once per frame to define a structure of a frame period, wherein the predetermined number of sub-frames in the defined bandwidth comprises every fourth or fifth sub-frame.

21. The apparatus as recited in claim 20, wherein the system information comprises a self-decodable channel coding block with an error detection code appearing once in every frame.

22. The apparatus as recited in claim 20, wherein the pilot is defined to be present in a first symbol of every sub-frame.

23. The apparatus as recited in claim 20, wherein the system information is transmitted once per frame to define frame timing.

24. The method as recited in claim 1, wherein the pilot comprises a primary common pilot.

25. The method as recited in claim 1, wherein the synchronization sequence comprises a primary synchronization sequence.

26. The method as recited in claim 1, wherein the system information is short system information.

27. The method as recited in claim 1, wherein the method is performed in an Evolved Universal Terrestrial Radio Access Network.

28. The method as recited in claim 2, wherein the system information is short system information.

29. The method as recited in claim 2, wherein the method is performed in an Evolved Universal Terrestrial Radio Access Network.

30. The computer program product as recited in claim 9, wherein the pilot to be transmitted is configured in a first symbol of every sub-frame.

31. The computer program product as recited in claim 9, further comprising a computer program embodied on a computer readable medium, the computer program being configured to cause, if the program is executed, an apparatus in a wireless communication system to perform:

adding at least one dedicated pilot symbol being same as the pilot for sub-carriers including the system information to create a channel estimate at a high velocity receiver.

32. The computer program product as recited in claim 9, wherein the pilot comprises a primary common pilot.

33. The computer program product as recited in claim 9, wherein the synchronization sequence comprises a primary synchronization sequence.

34. The computer program product as recited in claim 9, wherein the system information is short system information.

35. The computer program product as recited in claim 10, wherein the system information is short system information.

36. The computer program product as recited in claim 10, wherein the computer program is configured for an Evolved Universal Terrestrial Radio Access Network.

37. The communication system as recited in claim 12, wherein the pilot comprises a primary common pilot.

38. The communication system as recited in claim 12, wherein the synchronization sequence comprises a primary synchronization sequence.

39. The communication system as recited in claim 12, wherein the system information is short system information.

40. The apparatus as recited in claim 15, wherein the pilot comprises a primary common pilot.

41. The apparatus as recited in claim 13, wherein the synchronization sequence comprises a primary synchronization sequence.

42. The apparatus as recited in claim 13, wherein the system information is short system information.

43. The apparatus as recited in claim 13, wherein the apparatus is configured to operate in an Evolved Universal Terrestrial Radio Access Network.

44. The apparatus as recited in claim 13, wherein the apparatus is a mobile phone.

45. The apparatus as recited in claim 20, wherein the pilot comprises a primary common pilot.

46. The apparatus as recited in claim 20, wherein the synchronization sequence comprises a primary synchronization sequence.

47. The apparatus as recited in claim 20, wherein the system information is short system information.

48. The apparatus as recited in claim 20, wherein the apparatus is configured to operate in an Evolved Universal Terrestrial Radio Access Network.

* * * * *